(12) United States Patent
Sequeira (10) Patent No.: US 7,904,805 B2
(45) Date of Patent: Mar. 8, 2011

(54) SYSTEM AND METHOD FOR DISTRIBUTION AND NAVIGATION OF INTERNET CONTENT

(75) Inventor: William J. Sequeira, Oakland, CA (US)

(73) Assignee: Corporate Media Partners, Los Angeles, CA (US)

( * ) Notice: Subject to any disclaimer, the term of this patent is extended or adjusted under 35 U.S.C. 154(b) by 1369 days.

(21) Appl. No.: 10/663,385

(22) Filed: Sep. 16, 2003

(65) Prior Publication Data

US 2004/0205596 A1     Oct. 14, 2004

Related U.S. Application Data

(63) Continuation of application No. 09/768,879, filed on Jan. 23, 2001, now Pat. No. 6,620,205, which is a continuation of application No. 08/991,349, filed on Dec. 16, 1997, now Pat. No. 6,185,585.

(51) Int. Cl.
*G06N 3/00* (2006.01)

(52) U.S. Cl. ...................................................... 715/234
(58) Field of Classification Search .................. 715/234, 715/243, 254; 709/203
See application file for complete search history.

(56) References Cited

U.S. PATENT DOCUMENTS

| 6,285,461 | B1* | 9/2001 | Fujii et al. ..................... 358/1.18 |
| 6,507,867 | B1* | 1/2003 | Holland et al. ................ 709/219 |
| 6,826,594 | B1* | 11/2004 | Pettersen ....................... 709/203 |
| 6,857,102 | B1* | 2/2005 | Bickmore et al. ............. 715/205 |
| 7,356,530 | B2* | 4/2008 | Kim et al. ......................... 707/7 |
| 7,500,188 | B1* | 3/2009 | Trapani et al. ................ 715/273 |
| 2002/0083090 | A1* | 6/2002 | Jeffrey et al. .............. 707/501.1 |

OTHER PUBLICATIONS

Bickmore et al., "Web Page Filtering and Re-Authoring for Mobile Users," Apr. 21, 1999.*

* cited by examiner

*Primary Examiner* — Kyle R Stork
(74) *Attorney, Agent, or Firm* — Polsinelli Shughart PC (57) ABSTRACT

A system and method for navigating Internet content with a limited or non-existent return channel, limited bandwidth and/or a set-top box with limited processing power.

15 Claims, 10 Drawing Sheets

```
1   /** Select a page to process **/
2   /Paged Selected is next entry in PUT where Processed = N/
3   /** **/
4   For this pages {
5           /** Start Process **/
6           Create new entry in PPT
7                   Assign PARID/PPT = Link PARID/PUT
8                   Assign firstPartition = Link PARID/PUT
9                   Assign currentPartition = Link PARID/PUT
10          For all partitions in page {
11                  /** Start scanning current partition for links and anchors **/
12                  For all links found in currentPartition do {
13                          Separate link into link.location and link.anchorRef
14                          On type of Link {
15                                  Case: Link is an Anchor
16                                          Create new entry in PAM
17                                                  Assign Page First Partition/PAM = firstPartition
18                                                  /** Link is an anchor **/
19                                                  Assign Anchor/PAM = link.anchorRef
20                                                  Assign PARID/PAM = currentPartition
21                                  Case: Link is an Anchor URL
22                                          Create new entry in PLT
23                                                  Assign PARID/PLT = currentPartition
24                                                  Assign Anchor Reference/PLT = link.anchorRef
25                                                  If link.location in PUT
26                                                          /** The page has already been referenced **/
27                                                          Assign Link PARID/PLT = Link PARID/PUT
28                                                                  where URL/PUT equals link.location
29                                                  else
30                                                          /** New page reference **/
31                                                          Assign newParID = getNewParID()
32                                                          Create new entry in PUT
33                                                                  Assign URL/PUT = link.location
34                                                                  Assign Link PARID/PUT = newParID
35                                                                  Assign Processed/PUT = "N"
36                                                          Assign Link PARID/PLT = newParID
37                                  Case: Link is a Page URL
38                                          Create new entry in PLT
39                                                  Assign PARID/PLT = currentPartiton
40                                                  Assign Anchor Reference/PLT = NULL
41                                                  If link.location in PUT
42                                                          /** The page has already been referenced **/
43                                                          Assign Link PARID/PLT = Link PARID/PUT
44                                                                  where URL/PUT equals link.location
45                                                  else
```

FIG. 7A

```
46                                          /** New page reference **/
47                                          Assign newParID = getNewParID()
48                                          Create new entry in PUT
49                                                  Assign URL/PUT = link.location
50                                                  Assign Link PARID/PUT = newParID
51                                                  Assign Processed/PUT = "N"
52                                          Assign Link PARID/PLT = newParID
53                          }
54              If there are more partitions to process
55                      Assign newParID = getNewParID()
56                      Create entry in PPT
57                              Assign ParID/PPT = newParID
58                      setPrevNextPartitions(newParID)
59                      Assign currentPartition = newParID
60              }
61      Assign Processed/PUT = "Y"
62  }
```

FIG. 7B

| | URL | Link PARID | Processed |
|---|---|---|---|
| 800 | www.XYZ.com/page1 | 1 | Y |
| 802 | www.XYZ.com/page2 | 2 | Y |
| 804 | www.XYZ.com/page3 | 5 | Y |
| 806 | www.XYZ.com/page4 | 7 | N |

FIG. 8A

Page Partition Table (PPT)

| | PARID | Prev PARID | Next PARID | Phys Par Ptr | Processed |
|---|---|---|---|---|---|
| 810 | 1 | null | 3 | ptr1 | |
| 812 | 3 | 1 | 4 | ptr2 | |
| 814 | 4 | 3 | null | ptr3 | |
| 816 | 2 | null | 6 | ptr4 | |
| 818 | 6 | 2 | null | ptr5 | |
| 820 | 5 | null | null | ptr6 | |

FIG. 8B

Partition Links Table (PLT)

| | PARID | Link PARID | Anchor Reference | Command Tag |
|---|---|---|---|---|
| 830 | 1 | 2 | #anchor2 | (..., x1, y1, x2, y2, 2.#anchor2) |
| 832 | 3 | 2 | null | (..., x3, y3, x4, y4, 2) |
| 834 | 4 | 1 | #anchor1 | (..., x5, y5, x6, y6, 1.#anchor1) |
| 835 | 4 | 5 | null | (..., x7, y7, x8, y8, 2) |
| 836 | 6 | 1 | null | (..., x9, y9, x10, y10, 2) |
| 838 | 5 | 2 | #anchor3 | (..., x11, y11, x12, y12, 2.#anchor3) |
| 839 | 5 | 7 | null | (..., x15, y15, x16, y16, 7) |

FIG. 8C

Page Anchor Map (PAM)

| | Page First PARID | Anchor | PARID |
|---|---|---|---|
| 840 | 1 | anchor1 | 3 |
| 842 | 2 | anchor3 | 2 |
| 844 | 2 | anchor2 | 2 |

FIG. 8D

SYSTEM AND METHOD FOR DISTRIBUTION AND NAVIGATION OF INTERNET CONTENT

The present application is a Continuation of U.S. patent application Ser. No. 09/768,879, filed Jan. 23, 2001 now U.S. Pat. No. 6,620,205, entitled "SYSTEM AND METHOD FOR DISTRIBUTION AND NAVIGATION OF INTERNET CONTENT", which is a Continuation of Ser. No. 08/991,349 filed Dec. 16, 1997 now U.S. Pat. No. 6,185,585, issued Feb. 6, 2001, entitled "SYSTEM AND METHOD FOR DISTRIBUTION AND NAVIGATION OF INTERNET CONTENT".

BACKGROUND OF THE INVENTION

1. Field of the Invention

The Internet and the diversity and wealth of HTML-based Internet content available makes it desirable to exploit such content. The invention relates to a system and method by which HTML-based content is processed and distributed to a client in a manner which facilitates its delivery to the client.

2. Description of the Related Art

The most common mechanism to access Internet content today is through the use of a personal computer. Much of that Internet content is accessible as or via HTML-based (Hypertext Markup Language) Web pages. To access this content a user generally uses a personal computer ("PC"), for example, an Apple Macintosh or a PC running Microsoft Windows. In general, these PCs are configured with fast processors such as PowerPCs or Intel Pentium microprocessors and large amounts of memory. This level of hardware is necessary to effectively run today's resource intensive and full-featured Web browsers, like Netscapes Navigator, which processes the HTML-based Web page into a graphical screen capable in interacting with the user and Web servers. These PCs are connected to the Internet (and ultimately a Web server) usually via an ISP or online service using a modem line or a high-speed data link (symmetric or asymmetric), like a T1 (1.5 megabits per second) or T3 (45 megabits per second). These modem lines or high-speed data links are necessary due to the large amounts of data being transferred to the PC.

Communications over the Internet require that the PC has two-way, interactive, communications with the Internet content server. In the case of Web browsers, for example, the browser (running on a PC) initiates a request to a Web server for content (via a "return channel"). The Web server responds by sending the requested content, usually in HTML, to the browser (via a "forward channel"). The browser receives the HTML data, processes it and displays the Internet content as a graphical Web page to the user. Often these Web pages have hyperlinks embedded in the Web page which allow the user to request further Internet content. These hyperlinks are "addresses" or Uniform Resource Locator (URL's) which tell the browser where to find the content. By selecting a hyperlink, the user tells the browser to send a request to the computer hosting that Web page for that content or to jump to another section of a Web page.

Given the expense and complexity involved in purchasing and using a PC not all households have a PC. Even households that have PC may not have an Internet account due in part to costs and the inconvenience of tying up a telephone line during an online session. In contrast, most households today have television sets connected to receive cable services or wireless broadcasts and more advanced systems are moving toward a fully digital video broadcasting system, and thus may be used to transmit data. Unfortunately, under the present television broadcasting system, the frequency bandwidth allocation favors video and audio with only a small amount dedicated to data services. Accordingly, the amount of data that can be transferred via the forward channel is very limited and downloading multiple graphics, which are a mainstay of today's Web pages, would thus be unacceptably slow given the limited bandwidth. Moreover, even if Internet content were able to be provided to a user and displayed on a television set, there is often a very limited or no return channel capability, that is, the client is unable, for example, to communicate back to a Web server to request a Web page. Yet further, Web pages are designed for displaying on PC monitors, not television sets. Thus, displaying such a page on a television screen generally results in poor image quality and navigating around the page and accessing the hypertext links for a page designed for display on a PC is nearly impossible.

The problem of limited bandwidth is often further exacerbated by the requirement of a low-cost client. In a broadcast marketing paradigm, these clients are often distributed by a broadcast service provider and leased or sold to viewers and thus it is imperative to minimize the costs of these clients. This can be accomplished by configuring the client with a low-cost CPU (i e. slow) which may be able to perform only 2-6 million instructions per second ("MIPS"). In contrast, a CPU performing at 180 megahertz in a typical PC today, like the PowerPC, is able to perform around 50-70 MIPS, or higher. To further reduce costs, the client is usually configured with a very small memory footprint in the area of 1-4 megabytes. This type of client is usually unable to effectively process the amount of data contained in a graphically intense Web page, and can not communicate with the Web server due in part to its lack of a return channel, much less run today's resource intensive Web browsers.

Although Internet access devices using a television set are available, such as WebTV's set-top box for instance, these systems require the use of a telephone line as in today's dial-up lines. This allows the Internet access device forward and return channels to the Internet with adequate bandwidth for data transfer. These devices are thus like a simplified PC and-only use the television as a display device and do not solve the above problem of getting Internet content to a client constrained by memory, CPU requirements, a network with a limited forward channel and/or limited or no return channel.

SUMMARY OF THE INVENTION

The present invention solves the above-mentioned problems associated with the bandwidth and/or CPU and memory limitations of a client processing Internet content. In accordance with one aspect of the present invention, Internet content is first processed by the head end into partitions. Each partition is designed to be displayed as one screen of a display device. Information relating to the URLs and cross references to other partitions are also created and these partitions and information are transmitted to the client along with command tags which allow the client to simulate the experience of navigating and interacting with, for example, Web sites. The present invention is, of course, not limited to Internet content. For instance, internal networks can benefit from application of the present invention to reduce the bandwidth and processing power requirements. Another system that may practice the present invention would be in the use of kiosks where again limited bandwidth and low processing power are factors.

It is accordingly an object of the present invention to distribute Internet content to a processor to be displayed on an output device by collecting the Internet content, generating bit-mapped images from the Internet content for delivery to the processor, and distributing the bit-mapped images to the processor for presentation of the bit-mapped images to a user.

It is also an object of the present invention to distribute Internet content to a processor to be displayed on an output device by collecting Internet content, generating a first bit-mapped image of said Internet content wherein the Internet content includes a link and the first bit-mapped image includes a visual representation of said link, partitioning the first bit-mapped image into a set of bit-mapped images wherein each image in said set of bit-mapped images is suitable for display on the output device, generating a link tag for the link wherein the link tag is associated with the link, the visual representation of said link, and the image in said set of bit-mapped images which contains said visual link, and distributing the link tag and the set of bit-mapped images to the processor.

It is also an object of this invention to distribute Internet content by generating a first and second bit-mapped image of said respective first and second Internet content wherein said first Internet content contains a link referencing said second Internet content and first said first bit-mapped image contains a visual representation of said link, partitioning said first and second bit-mapped image into a first and second set of bit-mapped images wherein each image in said first and second set of bit-mapped images is suitable for display on the output device, generating a link tag for said link in said first set of bit-mapped images wherein said link tags are associated with said link, said visual representation of said link, and an image in said set of second bit-mapped images, and distributing said link tag and said set of second bit-mapped images to the processor.

It is also an object of this invention to distribute Internet content to a processor for displaying on an output device by generating a first and second bit-mapped image of said respective first and second Internet content wherein said first Internet content contains a link referencing said second Internet content and first said first bit-mapped image contains a visual representation of said link, partitioning said first and second bit-mapped image into a first and second set of partitions comprised of bit-mapped images wherein each image in said first and second set of partitions is suitable for display on the output device, assigning a unique partition id to each partition in said first and second set of partitions, generating a link tag for said link in said first set of bit-mapped images, associating said link tag with said partition id of said partition in said second set of partition which the link tag refers, and distributing said link tag and said first and second set of partitions to the processor.

These and additional objects of this invention can be obtained by reference to the following detailed description of the preferred embodiments thereof in connection with the attached drawings.

DETAILED DESCRIPTION OF THE PREFERRED EMBODIMENTS

Figure 1A:
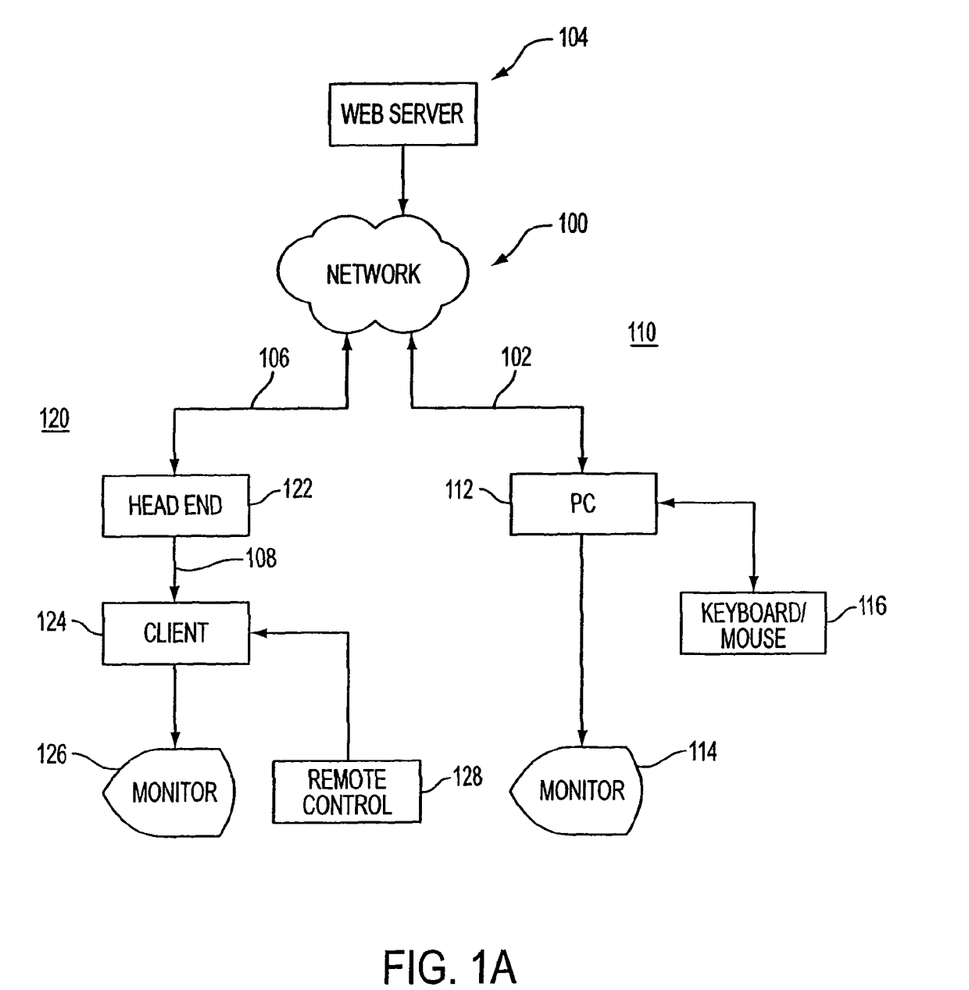
FIG. 1a shows a diagram of a high-level system and network diagram in accordance with one aspect of the invention.

FIG. 1a depicts an overview of a network practicing one aspect of this invention. In particular, System 110 depicts a traditional PC-based Internet connection. Specifically, PC 112 is a PC, such as a Macintosh or Windows-based PC, connected to Internet 100 via Network Connection 102. Network Connection 102 is usually a dial-up connection through an ISP or online service provider or a direct connection to the Internet via, for example, two-way wireless, or a high-speed T1 or T3 line. Such connections are bidirectional, have relatively high data bandwidths, and allows the PC to easily communicate with the Web Server 104. A browser, such as Netscape Navigator runs on PC 112 and processes the incoming Internet content and outgoing requests from and to Web server 104 over Network Connection 102. The incoming Internet content may be in the form of an HTML page with graphics and such, although the present invention is not limited to such Internet content: For instance, Internet content and HTML pages which may include Adobe PDF files, Shockwave sites, and other Internet media types. PC 112 (via the browser) renders the graphical image from the HTML page to be displayed on Monitor 114. A user sends a request to PC 112 through Peripheral 116, such as a keyboard, mouse, trackpad, pointing stick, light pen, or touch screen. PC 112 processes this request and forwards the request to Web Server 104.

In contrast, System 120 depicts a broadcast system where there is no, or limited bandwidth, return channel from Client 124 to Head End 122. Specifically, Head End 122 is connected to Internet 100 via Network Connection 106. Head End 122 may include a computer system designed to function in a broadcasting environment, for example, and serves to send requests to an Internet content provider, such as Web Server 104, and receive the requested Internet content. In the context of a video broadcast system, Head End 122 may encompasses a diversity of subsystems with the responsibility of delivering media assets to a client. These assets may include analog video and data, digital video, digital audio, bitmaps, data and other binaries necessary for the operation of System 120. Network Connection 106 may be implemented as a dial-up connection, or more typically in a commercial broadcast system, as a direct Internet connection using a dedicated or fractional T1 or T3 link.

Network Connection 108 delivers assets from Head End 122 to Client 124. Network Connection 108 typically has a higher capacity forward channel to the client in comparison with the return channel, if any. The return channel can include session based connections (a session is established for the entire time a user is accessing the system), discrete (a session is established only when dictated by policy, e.g., only when retrieving assets), or simply non-existent. Network Connection 108 can be implemented in many different ways including point-to-point (e.g., a dial-up connection) or broadcast channel (e.g., a wireless system distributing all assets simultaneously to many clients).

Client 124 is the subsystem responsible for the presentation (display) of the assets to a user, for example, on Monitor 126, which can be a computer monitor or a television set.

Client 124 has the ability to interface with Network Connection 108 (forward and, if available, any return channel). A user interacts with Client 124 via Controller 128, for instance, to select different hyperlinked Web pages.

Figure 1B:
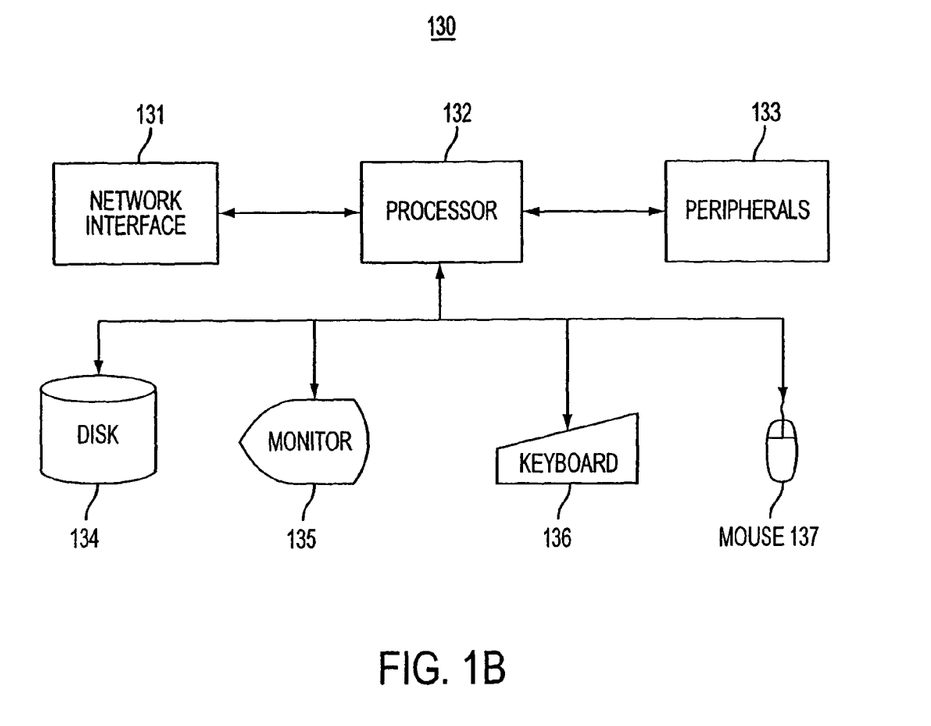
FIG. 1b shows a high-level block diagram of various components which may comprise a head end or client.

Referring now to FIG. 1b, there is depicted as System 130 a general component that is a part of Head End 122, or an internal part of Client 124. In particular, Head End 122 includes Processor 131, which may in turn be a single or multiple processor or even a single or multiple processor computer system. For Client 122, Processor 131 is typically a single CPU, although multiple processes and processors are also contemplated. Processor 131 runs the programs in accordance with various aspects of the present invention. Processor 131 interfaces with network connections via Network Interface 132. Data and programs may be stored and accessed by Processor 131 from Disk 137, which may be, but is not limited to, a single disk, multiple disks, RAID disk subsystems, solid-state disks, tapes, DVDs, even network servers, clusters and data carousels. Other interactions with Processor 131 may be via Peripherals 133, which include, but is not limited to devices such as video multiplexers, communication devices, store-and-forward devices. Interaction with a human operator may also be via Peripherals 133 (such as a printer), Monitor 136, Keyboard 135 and Mouse 134 (which may include joysticks, trackpads, light pens, etc.). In the context Client 122, Monitor 136 may correspond to Monitor 126 and Mouse 134 or Peripherals 133 may include Remote Control 128.

Referring back FIG. 1a, Network Connection 108 can be comprised of many different types of network architectures which are used for video broadcasts (although most commonly associated with digital video broadcasts). These include Hybrid Fiber to Curb ("HFC"), Fiber To The Curb ("FTTC"), Asymmetric Digital Subscriber Line (ADSL), Multichannel Multipoint Distribution System ("MMDS"), and Digital Broadcast System ("DBS"). HFC, FTTC, and ADSL are sometimes referred to as wired networks and have the ability, although not implemented in all systems, to create a return channel or session between client 124 and Head End 122. MMDS and DBS, are unidirectional wireless networks and thus have no return channel capability. In order to implement a return channel under these two architectures, a limited return channel may be implemented using an alternate network, such as a public switched telephone network using a dial-up connection.

MMDS and DBS (as well as some of the other methods to a lesser extent) also have additional limitations which are addressed by different aspects of the present invention. These include a limited bandwidth available for the forward channel, thereby restricting the total amount of bandwidth available for video, audio and data. Another limitation is the extremely limited, or even non-existent support for the return channel Yet another limitation is that the client has very limited memory, on the order of 2 megabytes or less of available memory, for storing code and media assets, thereby constraining the amount of media storage and type of processing that is possible. Yet another limitation is the slower processor generally used in the client (around 2-6 MIPS), thereby also limiting the ability of the client to process complex transactions, graphical rendering or other CPU-intensive tasks. Due to these and other limitations, in accordance with one aspect of the present invention, Head End 122 is first used to provide sophisticated processing of the Internet content and then transmitting the processed Internet content to Client 124.

Figure 6:
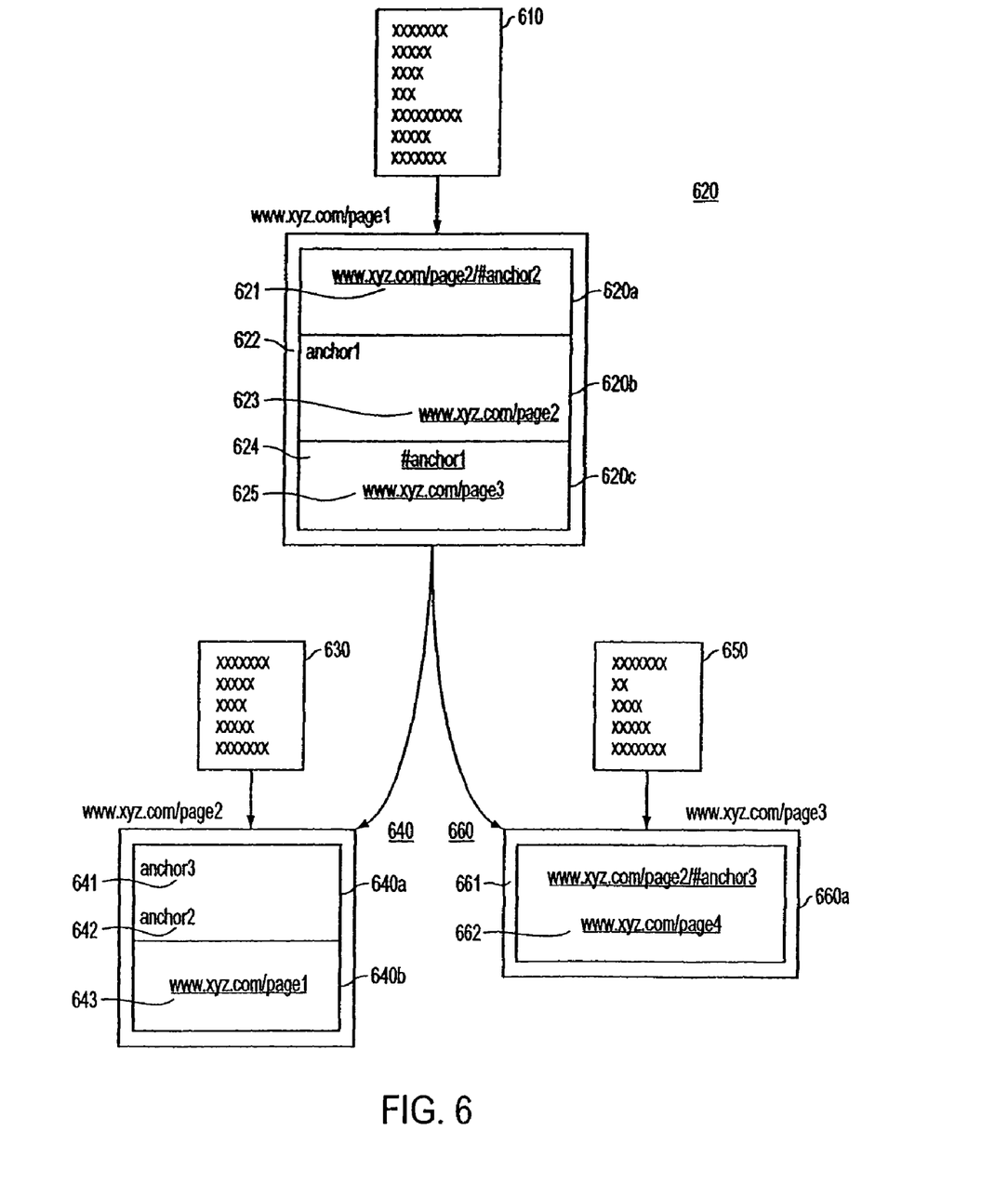
FIG. 6 shows for illustrative purposes HTML content for several Web pages and URLs, anchors and partitions.

Referring now to FIG. 6 there is shown an illustrative example of Internet content. In particular HTML Page 610, which describes a Web page displayed as Web Page 620. Likewise, HTML Page 630 and 650 describe Web Page 640 and 660, respectively. Moreover, in the manner of Internet addressing, Web Page 610/620, 630/640 and 650/660 are referred to by their URL addresses, which in this example are "www.xyz.com/page1", "www.xyz.com/page2", and "www.xyz.com/page3", respectively.

Referring now to Web Page 620, Web Page 620 contains Anchor URL 621, which references Anchor 641 on Web page 640. Thus, if a user clicked on Anchor URL 620 in a browser, the browser would retrieve Web page 640 (via HTML Page 630) and display the portion of the Web page containing Anchor 641. Web page 620 also contains Page URL 625. If a user clicked on Page URL 625 in a browser, the browser would retrieve Web page 660 (via HTML Page 650) and display that Web page from the top. Anchor URL 624 is an example of a URL which is used to jump/display another portion of the Web page. The other anchors and Page/Anchor URLs operate in like manner and are evident to one skilled in the art without further explanation.

In accordance with one aspect of the present invention, for Web Page 620 to be displayed on Monitor 126 via Client 122, Web Page 620 is partitioned, for purposes of illustration, into three Logical Partitions 620a-620c. As shown, Logical Partition 620a includes Anchor URL 621, Logical Partition 620b includes Anchor 622 and Page URL 623, and Logical Partition 620c includes Anchor URL 624 and Page URLs 625 and 626. Head End 122-also renders and creates a bitmap of Web Page 620, which is also partitioned into three physical partitions, which correspond to the images that will be displayed by Client 124. Preferably, Head End 122 divides the bitmap image so that it is able to be displayed fully on one screen of Monitor 126. For a television set, the bitmap would be partitioned into television screen sized physical partitions. In a like fashion, Web Page 640, is divided into two Logical Partitions 640a and 640b and Web page 660 is divided into Logical Partition 660a.

The information relating to the logical partitions for the Web pages, along with their corresponding physical partitions, are distributed to Client 124 for processing and display to simulate Web Page navigation without Client 124 being responsible for rendering, navigational processing or the need for a return channel.

Figure 2:
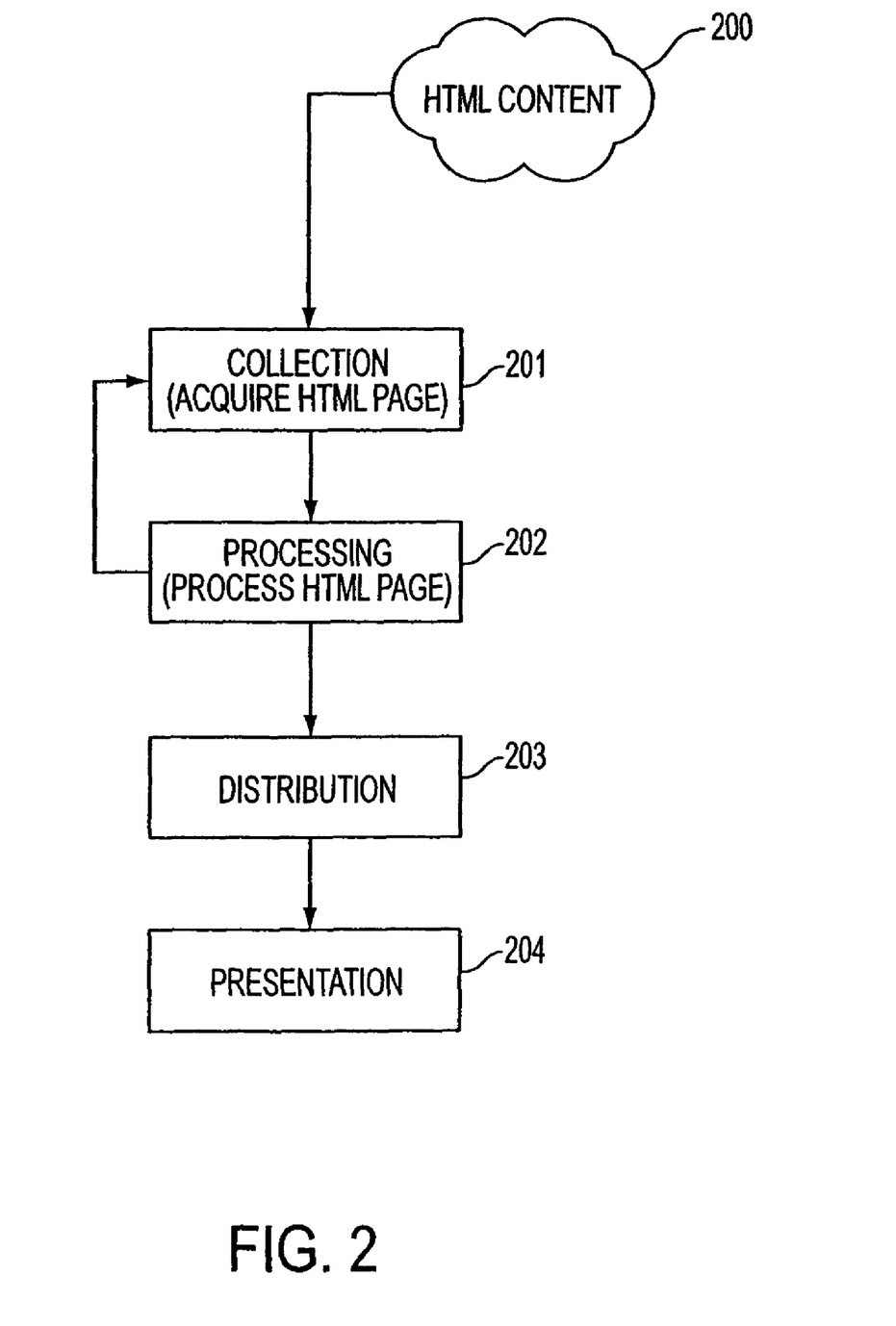
FIG. 2 shows a high-level flow diagram of a system practicing one aspect of the invention.

Referring now to FIG. 2, there is shown a high level diagram of a system practicing one aspect of the invention, preferably Head End 122. Specifically, Head End 122 acquires HTML pages in Collection Step 201, then processes and flattens those collected HTML pages to generate partitions in Processing Step 202, then distributes those partitions to Client 124 in Distribution Step 203 and Client 124 then presents those partitions to the user in Presentation Step 204.

Figure 3:
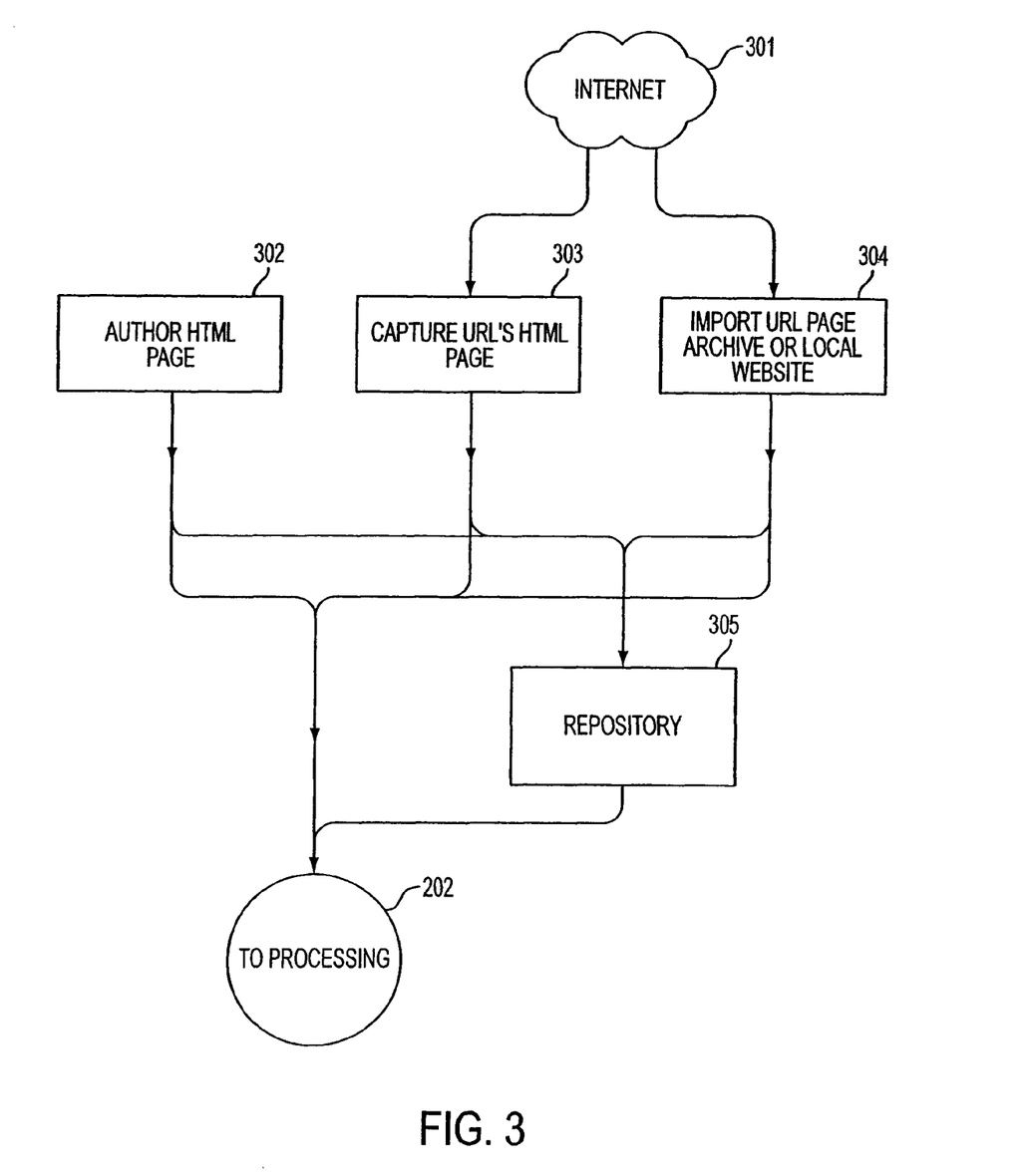
FIG. 3 shows a detailed diagram of collection Step 201 in accordance with one aspect of the invention.

More specifically, in collection Step 201 Head End 122 gathers HTML pages and stores those pages in a repository for further processing. HTML content is available from many different sources, as shown in FIG. 3, including, but not limited to, the Internet (Internet Source 301), local caches, archives or Web sites (archive/Local Source 304), and authoring tools which generate static and/or dynamic HTML pages (Author Source 302). HTML pages generally also have a number of links to other pages and Collection Step 201 may use those links to gather each of those pages referred to in URL Capture 303 for storage in Repository 305, which could be a hard disk. It is possible that following links for each gathered page can lead to an unmanageable number of pages, and thus the number of levels of HTML pages gathered should be limited. This can be accomplished, for example, by the use of a user defined parameter which specifies the number of levels down a Web site that Collection Step 201 processes. Another parameter may limit collection of Web page links to just those available on a specific Web site. Of course, the combination of these and other methods of limiting the scope of page collection can also be utilized. Various methods of generating and/or collection such pages are well-known to one skilled in the art.

Figure 4:
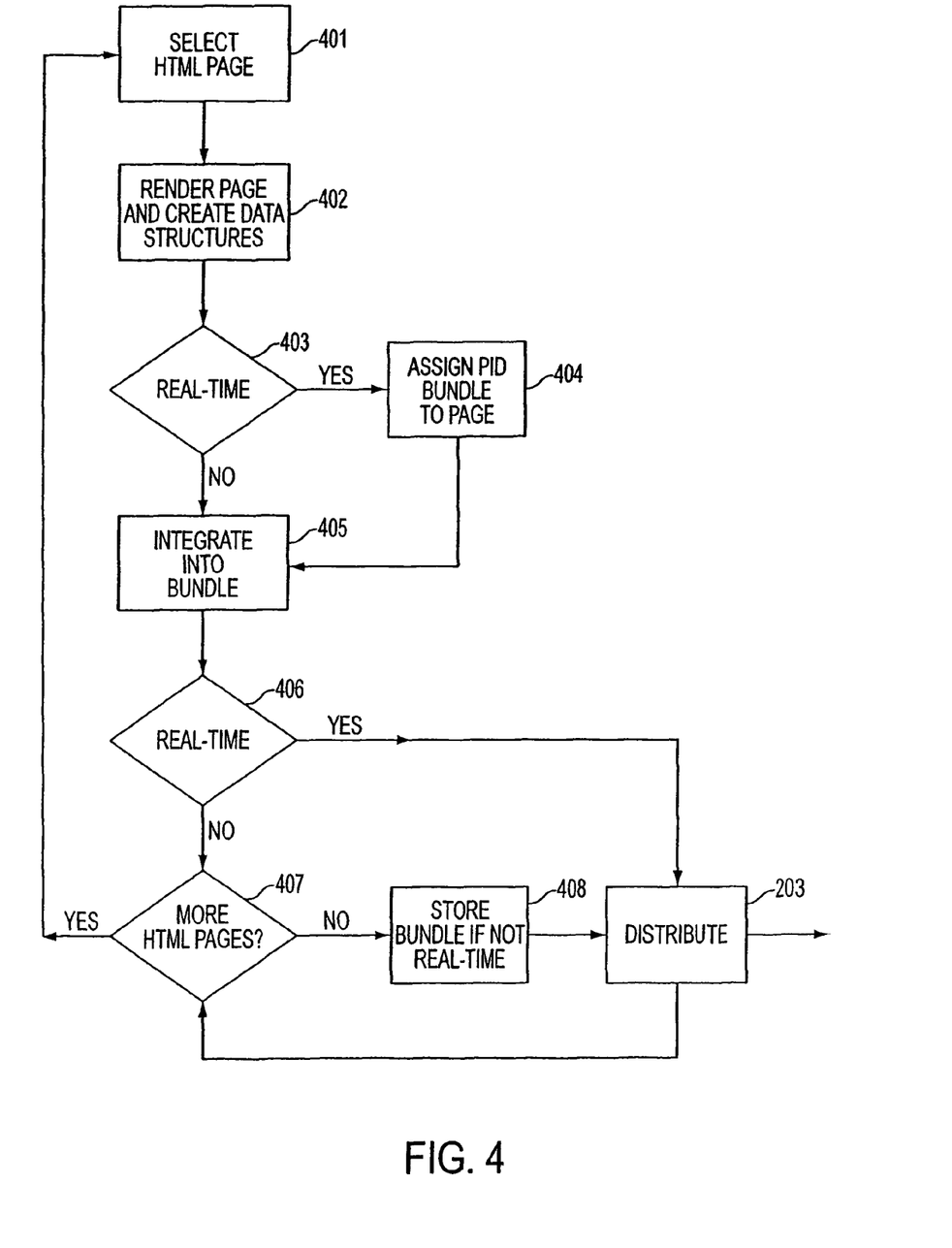
FIG. 4 shows a detailed diagram of processing Step 202 in accordance with one aspect of the invention.

Once the HTML pages have been gathered, Head End 122 processes the pages stored in Repository 305 in Processing Step 202. In this step, the gathered HTML pages are flattened and divided into partitions. FIG. 4 illustrates processing Step 202 in greater detail.

In Step 401, Head End 122 selects an HTML page for processing which had been acquired in Step 201. Head End 122 then proceeds to Step 402 where it renders the HTML page and generates the appropriate data corresponding to that HTML page for Client 124.

Figure 5:
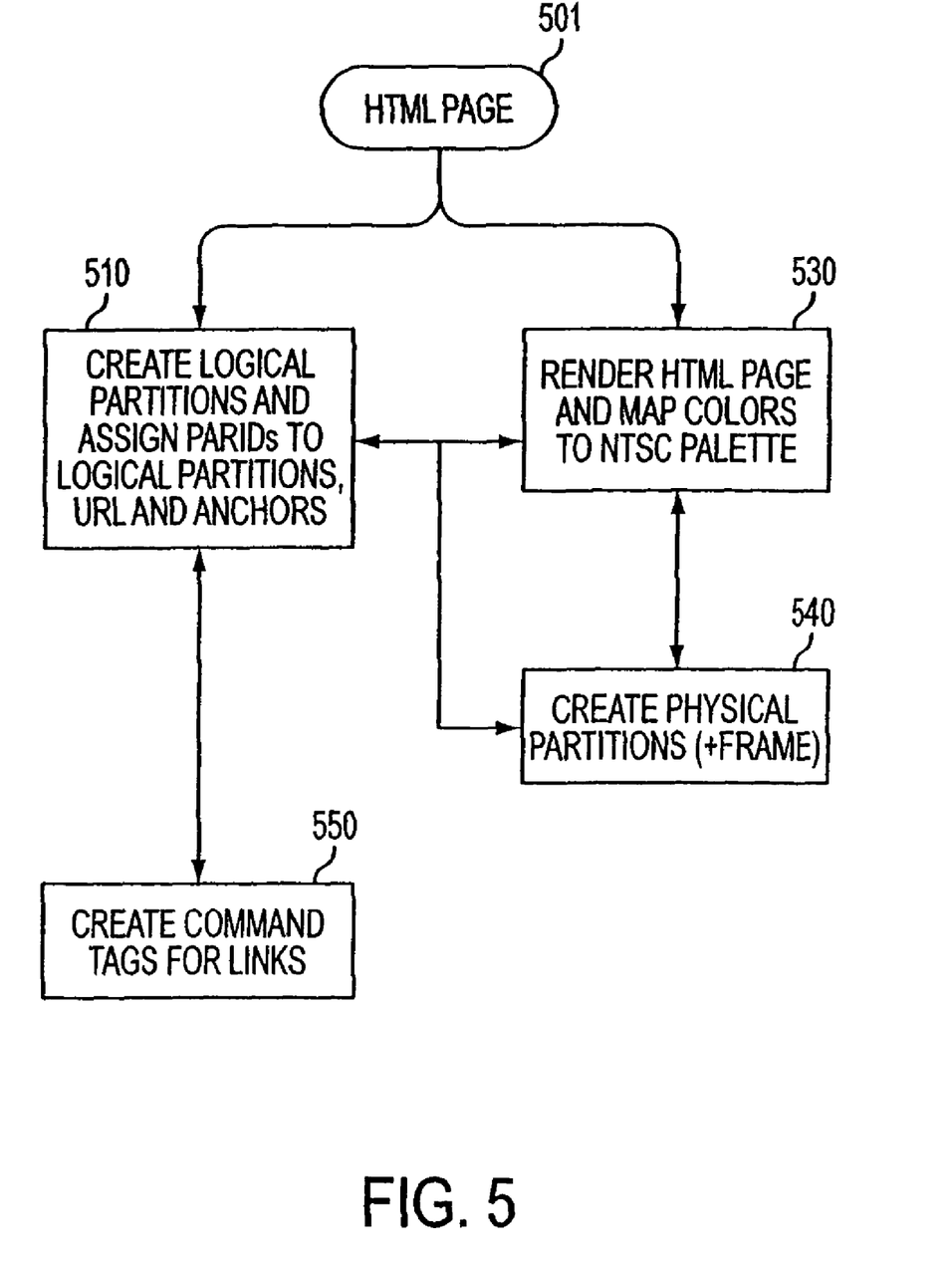
FIG. 5 shows a detailed diagram of Step 402 in accordance with one aspect of the invention.

FIG. 5 depicts in greater detail Step 402. In particular, there is shown in FIG. 5 Internet content, which, in this example, is an HTML page obtained from Step 401. For the Web page described by the HTML page to be displayed by Client 124, the HTML page is rendered, converted into a bitmap and partitioned so that each partition can be displayed by Client 124 as a separate image. More specifically, FIG. 5 depicts an exemplary embodiment which illustrates one aspect of the present invention, although other embodiments and variations fall within the scope of the invention.

Referring now more specifically to FIG. 5, HTML page 501 is rendered in Step 530 to generate the graphical page as described by the HTML data. During this step, Head End 122 determines if there are any animated graphics, and if there are, renders one frame of the animation to make the animated image a static image for inclusion in the HTML page. The result is a rendered HTML page complete with graphics and animated graphics rendered as one static image.

The colors used in the rendered image may not display well on monitor 126, which typically would be a television set. Thus, Head End 122 also maps the colors of the rendered image to a NTSC color palette. This provides a palette of colors that would look and display well on a television set. Of course, other mappings are possible and are within the scope of the invention and these mappings would be designed so that images would look good on the particular output device designated as Monitor 126.

In addition, the rendered image, including graphic images, may have specified the use of a large color palette. For instance, an image using a 16-bit depth for color would provide a color palette of approximately 65,000 colors. A 24-bit depth would provide a color palette of more than 16 million colors. Using such a large color palette would necessitate the need for large amounts of memory and forward channel bandwidth to transfer large amounts of data to Client 124, as well as a fast processor to manipulate that data—resources which Client 124 may not have. Accordingly, Head End 122 creates a bitmap of the rendered page and reduces the bit depth of the bitmap to a predetermined bit depth, for example, from 16-bits per pixel to 8-bits per pixel, giving a color palette of 256 colors. In accordance with another aspect of this invention, Head End 122 could use different bit-depths for different types of pages. For example, Head End 122 could use an 8-bit depth for a bitmap generated from a rendered page containing graphic images, while using a 4-bit depth is used for a bitmap generated from a rendered page that contained only text.

Using the information from Step 530, in one embodiment, Head End 122 in Step 510 creates the logical partitions and assigns identifiers to those partition ("PARIDs") sequentially. URLs and Anchors in each partition are also process and assigned PARIDs concurrently with the creation of each logical partition and before the creation of the next logical partition.

In order to generate the logical partitions for either embodiment, Head End 122 must either first, or concurrently with Step 510, generate the necessary rendered and bitmap data described with respect to Step 530. Although it is possible for Head End 122 to process Step 530 after Step 510, it would be inefficient to do so since some of the information generated in Step 530 would also be needed in Step 510 to generate the logical partitions.

Although the preferred embodiments are described herein the invention is not limited to the order of processing as described and the order of processing does not limit the scope of the invention. For example the colors may be mapped to the NTSC palette in other steps, such as in Step 510 or Step 540 without detracting from the scope.

Head End 122 in Step 540 takes each physical partition associated with each Logical Partition, and, if desired, adds navigational buttons to each bitmap. Head End 122 in Step 550 creates and adds link tags in the form of Command Tags for the links/hyperlinks.

In the preferred embodiment, Command Tags provide a means by which to convey information to Client 124. Such information may include indicia of the location of a hyperlink in an image and what partition Client 124 should display. In particular, a generalized form of this type of command tag may be given by:

( . . . , location, destination)

The location parameter are a series of coordinates which indicate to Client 124 where in a screen a particular link is located. Exemplary coordinate systems are Cartesian, polar, or other types of coordinate systems, but the preferred embodiment uses an x-y coordinate system where (0,0) is located at the upper left corner and extends positive going right and down of the axes.

The destination parameter indicates which page Client 124 should display if the link at location is selected. In the preferred embodiment, this parameter takes the form of parid.#anchor (an exemplary example is shown in Entry 830) where parid is the PARID of the partition and associated page anchor map entries. The page anchor map identifies where anchors are located on a Web page which has been partitioned and provides the PARID of the partition which contains the anchor.

An exemplary command tag is given in Entry 830 in the Command Tag field. This command tag, ( . . . , x1, y1, x2, y2, 2.#anchor2) indicates that a link's location is a rectangle having an upper left corner coordinate of (x1, y1) and a lower right corner coordinate of (x2, y2). The destination parameter of "2.#anchor2" means that Client 124 first retrieves the partition with PARID=2, then it retrieves that page's Page Anchor Map (for instance, Entries 842 and 844), finds which entry has the anchor identified by anchor2 (Entry 844), and obtains the partition's PARID which contains that anchor (partition with PARID=2). This is discussed in more detail below.

The command tag as described is only one way of providing information to Client 124. Of course, other forms and parameters can be provided in the command tag to, for instance, to indicate the type of tag.

Figure 7B:
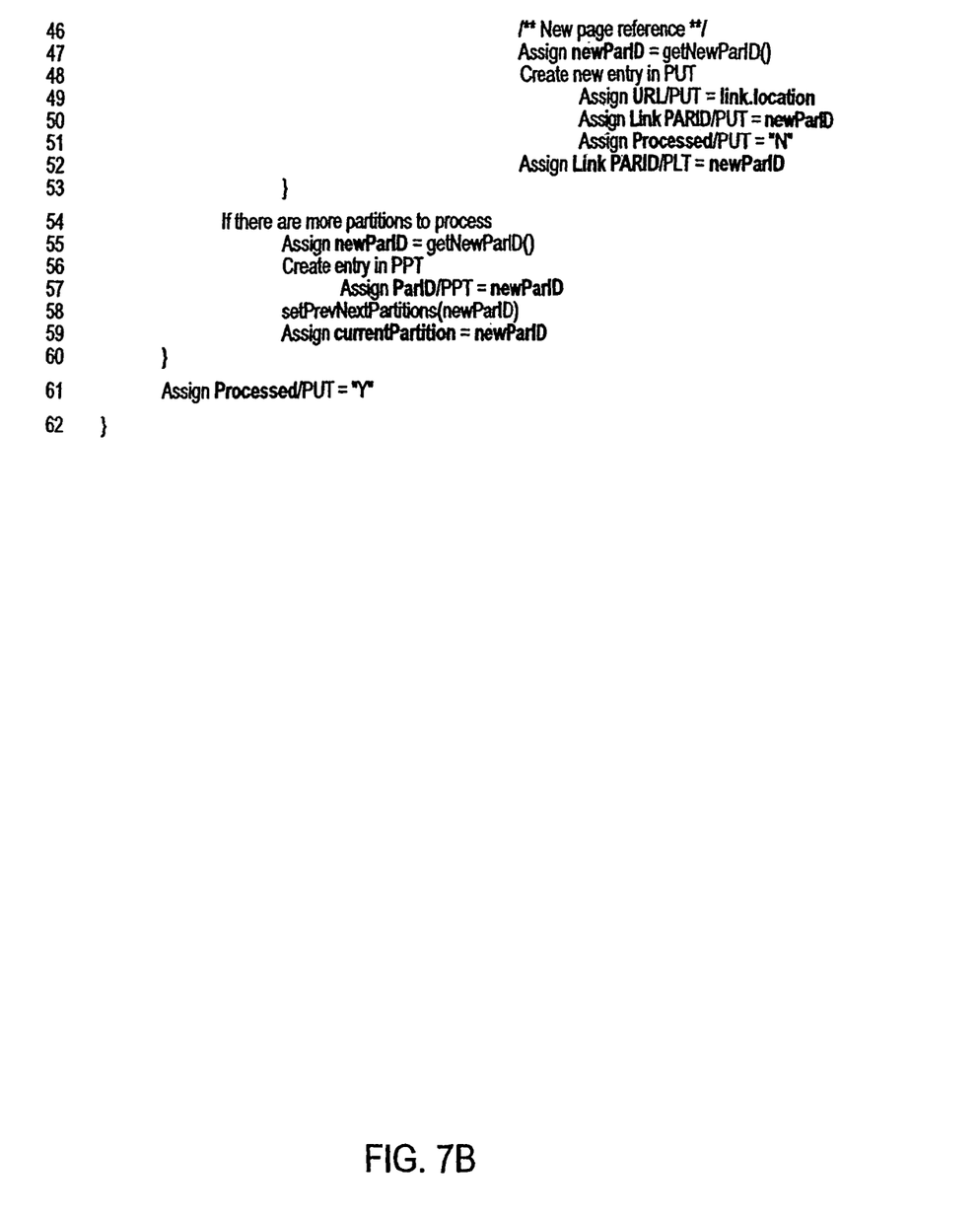
FIG. 7 lists pseudo-code for processing and generating data in accordance with one aspect of this invention.

Step 510 will now be described in more detail with reference to FIGS. 7 and 8. FIG. 7 sets forth in pseudo-code format one embodiment of Step 510 which interacts with the databases depicted in FIG. 8 as Page URL Table ("PUT") 8a, Page Partition Table ("PPT") 8b, Partition Links Table ("PLT") 8c and Page Anchor Map ("PAM") 8d. To further illustrate various aspects of this invention, reference will now be made to FIGS. 7 and 8 which will populate the tables in FIG. 8 with respect to the exemplary Internet content set forth in FIG. 6. For ease of description, the specific fields in each table are referred to in FIG. 7 in the form of field name/table name. Thus, PARID/PPT refers to the PARID field of table PPT in a record.

Figure 8A:
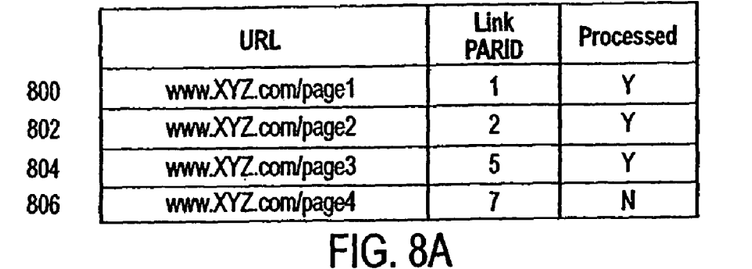
FIG. 8 shows databases used by the pseudo-code listed in FIG. 7.

With reference to FIG. 8, FIG. 8a, the Page URL Table contains the URLs for all pages referenced in a particular group of pages, for instance, a Web site. In FIG. 8b, the Page Partition Table tracks the partitions which make up a specific page and the PARIDs for each of those partitions. In addition, links are maintained to identify the order of the partitions for a page. Also include are pointers, represented by p1-p7, which point to the physical partition, that is, the bit maps, of the partitions which Client 124 displays.

Prior to processing a group of Web pages, Head End 122, for instance, in Step 401, creates a new entry (or record) 800 in PUT and enters the root page URL into URL/PUT, assigns it a PARID ("1" in this example), sets Link PARID/PUT to "1" and sets Processed/PUT to "N". In the preferred embodiment, a "ticket" system is used to determine the next PARID to be allocated. That is, PARIDs are allocated sequentially, when needed, and then assigned to partitions or hyperlinks, in accordance with one aspect of this invention. Head End 122 selects a page from the PUT which has not been processed, that is, where Processed/PUT has a "N" entry. In the example, Head End 122 selects Entry 800.

Head End 122 then processes all links in the current partition (Logical Partition 620a)(line 12). To create the logical partitions, Head End 122 may use HTML Page 610 to determine where Web Page 620 can be partitioned. In the preferred embodiment, Head End 122 partitions the bitmap during the rendering process into size that will be able to be completely displayed on Monitor 126. Head End 122 can then mark where the partition occurs in HTML Page 610. Any URL or Anchors within this can then be processed in later steps. Of course, other ways of identifying the partitions are known one skilled in the art. The creation of a partition can take place either one at a time where the links in each partition are processed as they are created, or all the partitions can be created first and then the links processed.

Head End 122 creates a new entry in the PPT (line 6) and assigns PARID/PPT the value of Link PARID/PUT, currently "1" (line 7). Thus, partition 620a's URL is assigned a PARID=1. Head End 122 also assigns variables firstPartition and currentPartition the value of Link PARID/PUT, currently "1"(lines 8 and 9). In this example, the first link, portions of Anchor URL 621 are parsed and assigned to variable link.location and link.anchorRef (line 13). Specifically, link.location="www.xyz.com/page2" and link.anchorRef="#anchor2". Since the link is an Anchor URL, Head End 122 creates a new entry 830 in the PLT (line 22), sets PARID/PLT to "1" (line 23) and sets Anchor Reference/PLT to "#anchor2" (line 24). Head End 122 then checks to see if link.location, that is, "www.xyz.com/page2", is in the PUT (line 26). Since it is not at this point, Head End 122 assigns a variable newParID a new PARID (line 31), which in this instance is "2", creates a new entry 802 in the PUT (line 32) and sets URL/PUT="www.xyz.com/page2"(line 33), Link PARID/PUT="2" (line 34), Processed/PUT="N" (line 35), and Link PARID/PLT="2" (line 36). This completes processing for this link.

Figure 8B:
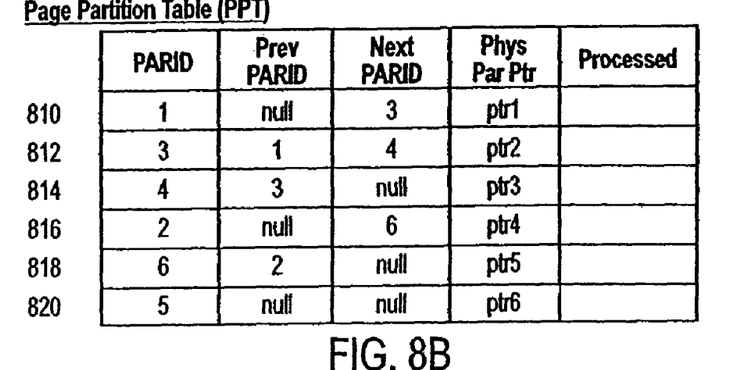
Figure 8C:
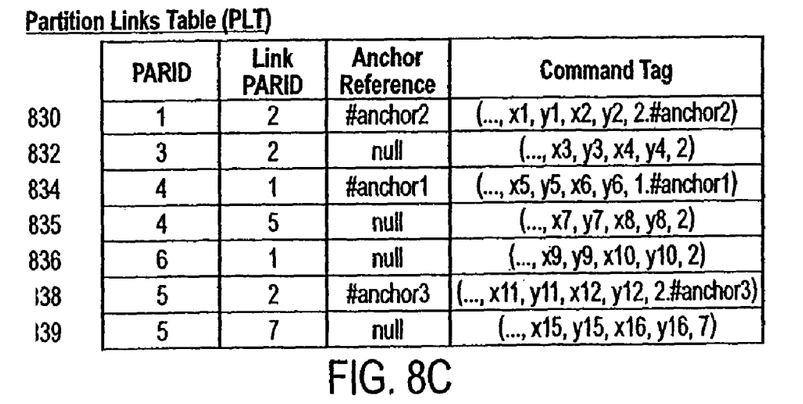
Figure 8D:
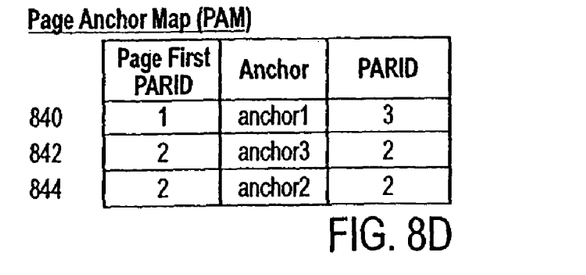

Since there are no further links to process in this partition, Head End 122 then proceeds to process the next partition (line 54) by obtaining a new PARID ("3") and setting the variable newParID to this PARID (line 55). Head End 122 then creates a new entry 812 in the PPT (line 56) and sets ParID/PPT="3" (line 57). Next Head End 122 sets PrevPARID/PPT in the current entry to the previous paritition's PARID and the NextPARID/PPT in the previous partition's entry to the current entry's PARID (line 58). This maintains the links between the partitions. Head End 122 then sets the variable currentPartition to the partition's PARID, currently "3" (line 59).

In this example, Head End 122 now proceeds to process the links in Logical Partition 620b. The first link processed, URL 622 is an anchor and Head End 122 sets link.location to "NULL" and link.anchor.ref to "anchor1" (line 13). Because the link is an anchor, Head End 122 creates a new entry 840 in the PAM (line 16). It then sets Page First Partition/PAM to "1" (line 17), Anchor/PAM to "anchor1" (line 19) and PARID/PAM to "3" (line 20).

The next link processed in this partition is URL 623. Head End 122 sets link.location to "www.xyz.com/page2" and link.anchor.ref to "NULL" (line 13). Since this is a page URL, Head End 122 proceeds to create a new entry 832 in the PLT (line 38) and sets PARID/PLT="3" (line 39) and Anchor Reference/PLT="NULL" (line 40). Head End 122 then checks to see if link.location, "www.xyz.com/page2"is already in the PUT. Since it is (entry 802), Head End 122 sets Link PARID/PLT to the value of Link PARID/PUT of the entry containing "www.xyz.com/page2" (lines 43 and 44), which in this example is "2". Head End 122 then determines that it has completed all links in this partition (line 12).

Head End 122 next determines if there are more partitions to process (line 54), which there are. Thus, Head End 122 then proceeds to process the next partition (line 54) by obtaining a new PARID ("4") and setting the variable newParID to this PARID (line 55). Head End 122 then creates a new entry 814 in the PPT (line 56) and sets ParID/PPT="4" (line 57). Next Head End 122 sets PrevPARID/PPT in the current entry to the previous paritition's PARID and the NextPARID/PPT in the previous partition's entry to the current entry's PARID (line 58). This maintains the links between the partitions. Head End 122 then sets the variable currentPartition to the partition's PARID, currently "4" (line 59).

In this example, Head End 122 now proceeds to process the links in Logical Partition 620c. The first link processed, URL 624 is an anchor URL and Head End 122 sets link.location to "www.xyz.com/page1" and link.anchor.ref to "#anchor1" (line 13). Link.location contains the URL of the page being process because URL 624 is a hyperlink within the same page. Since the link is an Anchor URL, Head End 122 creates a new entry 834 in the PLT (line 22), sets PARID/PLT to "4" (line 23) and sets Anchor Reference/PLT to "#anchor1" (line 24). Head End 122 then checks to see if link.location, that is, "www.xyz.com/page1", is in the PUT (line 26). Since it is, Head End 122 simply sets Link PARID/PLT to the value of Link PARID/PUT of the entry containing "www.xyz.com/page1" (lines 28 and 29), which in this example is "1".

Head End 122 then processes the next link, URL 625. Head End 122 sets link.location to "www.xyz.com/page3" and link.anchor.ref to "NULL" (line 13). Since this is a page URL, Head End 122 proceeds to create a new entry 835 in the PLT (line 38) and sets PARID/PLT="4" (line 39) and Anchor Reference/PLT="NULL" (line 40). Head End 122 then checks to see if link.location, "www.xyz.com/page3"is already in the PUT. Since it is not, Head End 122 gets a new PARID (line 46) and set the variable newParID to that number, which is now 5 in the current example. Head End 122 then proceeds to create a new entry 804 in the PUT (line 48) and sets URL/PUT="www.xyz.com/page3" (line 49), Link PARID/PUT="5" (line 50), and Processed/PUT="N" (line 51). Finally, Head End 122 sets Link PARID/PLT="5".

At this point, Head End 122 has processed all links in all partitions in Web Page 620. Head-End 122 then sets Processed/PUT="Y" for, in this example, entry 800 (line 61) and Step 510 is completed (line 63).

In Step 540, Head End 122 adds, if desired, navigational graphics to assist a view in moving from one partition to another and adds the appropriate Command Tags to table 8b in the field "Command Tag". In addition, pointers p1-p7 to the actual physical partition data is entered in the PPT for each of the partitions.

Likewise, Head End 122 uses the bitmaps generated from above processing and other data, such as HTML Page 610 and Logical Partitions 620a-c to generate the appropriate Command Tag for each link for Web Page 620 in Partition Links Table 8c. This completes Step 402.

Referring back to FIG. 4, after Steps 402-406, 408 and 409, Head End 122 determines in Step 407 if there are more HTML pages to process. One way to do this is for Head End 122 to use the Processed field in table 8a to select each Page URLs that does not have a "Y" in that field. In the manner described above, the remaining Web Page 640 and 660 are processed and the results shown in tables 8a-d.

Steps 402-406, 408 and 409 will now be discussed. Referring back now to FIG. 4, for each Web page processed in Step 402, Head End 122 determines if the data is needed in real-time in Step 403, and if so, proceeds to Step 404 to further process the data for immediate transfer. In the preferred embodiment, a data carousel is used to distribute the partitions. Accordingly, in Step 404 each partition for the page is assigned a process identifier ("PID"), which is used in the data carousel to identify the particular partition. To help evenly distribute the process, Head End 122 can use a modulo N hashing function to assign the PID where N is the number of slots available in the data carousel. Thus, for each partition, its PID is the function PID=Modulo N (PARID).

In Step 405, for each partition, all the data for that partition is integrated in a "bundle" in a form suitable for distribution to, and for processing by, Client 124. Of note is that in embodiment shown in FIG. 8, the PAM data for each page is also attached to the first partition of that page. Thus, for instance, entry 840 is attached to the partition with PARID=1. Similarly, entries 842 and 844 are attached to the partition with PARID=2. This information provides Client 124 with the data needed to determine what anchors are in a page, and where those anchors are located. In addition, if page navigation buttons are included to provide a means to navigate among the partitions of a page, additional information and command tags in the format shown in FIG. 8c, are included to provide the appropriate links for the next and previous navigation buttons for navigating among the partitions for that page. These navigational command tags can be created from the information in the PPT. For instance a link from partition 620a to 620c may have a command tag of ( . . . , x13, y13, x14, y14, 3). Thus, a bundle for a page such as 620a is comprised of the partitions (logical and physical with PARIDs)which comprise that page, the page anchor map (e.g. Entry 840), and command tags (e.g., ( . . . , x1, y1, x2, y2, 2.#anchor2)).

If the data is needed in real-time (Step 406), Head End 122 immediately places the bundles in a data carousel in accordance with the bundle's PID for distribution in Step 203 and flow proceeds to Step 407.

Referring back to Step 403, if Head End 122 determines that the data is not needed in real-time, then Head End 122 integrates the data into bundles in Step 405 but does not yet distribute the bundles and flow proceeds to Step 407.

In Step 407, Head End 122 determines if there are more HTML pages to process and if so, the processing repeats from Step 401. Once all HTML pages have been processed, flow proceeds to Step 408 where Head End 122 proceeds to store all bundles (if not real-time) and proceeds to distribution Step 203 and distributed to Client 124 in Step 203 via Network 108.

Once Client 124 receives the bundle(s), Client 124 extracts the data, including the physical partitions and Command Tags. Client 124 can then display the bitmap and take action to display other appropriate physical partition bitmaps depending on the view action in accordance with the Command Tags.

In using this data, Client 124 can use the Command Tags to navigate through a page since it has the information needed to determine the previous and next partition to display. When selecting a link, for instance URL 621, Client 124 determines that it is an Anchor URL ("2.#anchor2" in the Command Tag). Client 124 then retrieve the PAM information from the partition with PARID=2 and finds that "#anchor2" is located in the partition with PARID=3. Using that information, Client 124 can then display the partition with PARID=3 in response to selecting the link. In the case where a Page URL is selected, such as URL 623, Client 124 determines that it is an Page URL since there is no anchor part ("2" only in the second parameter of the Command Tag in entry 832). In this instance, Client 124 does not need to access PAM information and can simply display the partition with PARID=2.

Referring back now to FIG. 6, the processing of page 640 will now be generally described. In particular, Partition 640a is assigned a PARID=2 in Entry 816 of the PPT since page 640's URL has a PARID=2 in the PUT (lines 6-9). Next, Head End 122 processes Anchor 641 by adding Entries 842 and 844 for anchors 3 and 2, respectively (lines 16-20).

For the next partition, Partition 640b, a new PARID is assigned (PARID=6), a new entry created in the PPT (Entry 818), and the PrevPARID and NextPARID fields are set (lines 55-59). URL 643 is then processed by creating a new Entry 836 in the PLT (lines 13, 3940) and since the URL (link.location) that it refers to is already in the PUT, a new entry in the PLT is added and the LinkPARID/PLT is assigned PARID=1 (lines 43-44). The page URL in the PUT is then marked as processed (line 61).

The processing of Page 660 will now be generally described. Specifically, Partition 640a is assigned a PARID of 5 since that URL of that page is already in the PUT (lines 6-9). Next, Head End 122 process URL 661 by creating a new Entry 838 in the PLT. Since URL 661's link.location ("www.xyz.com/page2") is already in the PUT, it sets for Entry 838 LinkPARID/PLT to "2" and AnchorReference/PLT to "#anchor3" (lines 22-28). For the next URL, URL 662, Head End 122 creates a new Entry 839 in the PLT (line38-40). Since this URL is not in the PUT, Head end 122 obtains a new PARID (line 47), creates a new Entry 806 in the PUT and set URL/PUT to link.location ("www.xyz.com/page4"), LinkPARID/PUT to 7 (lines 48-50) and Processed/PUT to "N". Next, Head End 122 sets in Entry 839 LinkPARID/PLT to "7" (line 52).

In the manner described above, the present invention thus provides a system and method to navigate Internet content with a limited or non-existent return channel. While this invention has been described with reference to the preferred embodiments, other modifications will become apparent to those skilled in the art by study of the specification and drawings. It is thus intended that the following appended claims include such modifications as fall within the spirit and scope of the present invention.

What I claim is:

1. A system for converting interactive Internet content to a form suitable for distribution to clients with a limited or non-existent return channel while preserving the interactivity of the content, the system comprising:
    a storage media comprising program code and a plurality of data structures, the plurality of data structures including
    a Page Uniform Resource Locator ("URL") data structure storing data for use in identifying pages of interactive Internet content;
    a Page Partition data structure storing data for use in tracking partitions that make up a page of interactive Internet content; and
    a Partition Link data structure storing data for use in tracking navigation data contained in a particular partition of a plurality of partitions; and
    a processor to execute the program code to enable the system to select and partition a single page of the interactive Internet content into the plurality of partitions, each single page being related to a page anchor map relating each Partition Link data structure to each associated Page Partition data structure to integrate data stored in the Page URL, Page Partition, and Partition Link data structures and partitions into a bundle, and to distribute the bundle to a client device having a monitor, wherein each of the plurality of partitions is displayed fully on the monitor.

2. The system of claim 1, wherein the Page URL data structure contains data regarding the URL of the selected pages and a unique identifier for each page of the selected pages.

3. The system of claim 1, wherein the Page Partition data structure contains a unique identifier for each partition of the plurality of partitions.

4. The system of claim 3, wherein the Page Partition data structure contains the previous and next partition relative to any selected partition of the plurality of partitions.

5. The system of claim 1, wherein the Partition Link data structure contains data regarding location and destination of each link in a particular partition of the plurality of partitions.

6. The system of claim 5, wherein the location data contained in the Partition Link data structure is formatted according to one type of coordinate system selected from the group consisting of x-y coordinates, x-y-z coordinates, or polar coordinates.

7. The system of claim 1, wherein the storage media is a disk.

8. The system of claim 1, wherein the processor renders and creates a bitmap image of the single page of the interactive Internet content prior to partitioning of the single page and then divides the bitmap image of the single page into the plurality of partitions when partitioning the single page such that each of the plurality of partitions is displayed fully on the monitor.

9. A method for converting interactive Internet content into a form suitable for distribution to clients with a limited or non-existent return channel while preserving the interactivity of the interactive Internet content comprising:
    storing data for use in identifying a page of interactive Internet content in a Page Uniform Resource Locator ("URL") data structure of a storage media;
    storing data for use in tracking partitions that make up the page of interactive Internet content in a Page Partition data structure of the storage media;
    storing data for use in tracking navigation data contained in a particular partition of a plurality of partitions in a Partition Link data structure of the storage media;
    receiving one or more pages of interactive Internet content at a processor; and
    processing the one or more pages of interactive Internet content at the processor to select and partition a single page into the plurality of partitions, each single page being related to a page anchor map relating each Partition Link data structure to each associated Page Partition data structure to integrate data stored in the Page URL, Page Partition, and Partition Link data structures and partitions into a bundle, and to distribute the bundle to a client device having a monitor, wherein each of the plurality of partitions is displayed fully on the monitor.

10. The method of claim 9, wherein the Page URL data structure contains data regarding the URL of the selected pages and a unique identifier for each page of the selected pages.

11. The method of claim 9, wherein the Page Partition data structure contains a unique identifier for each partition of the plurality of partitions.

12. The method of claim 11, wherein the Page Partition data structure contains the previous and next partition relative to any selected partition of the plurality of partitions.

13. The method of claim 9, wherein the Partition Link data structure contains data regarding location and destination of each link in particular partition of the plurality of partitions.

14. The method of claim 13, wherein the location data contained in the Partition Link data structure is formatted according to one type of coordinate system selected from the group consisting of x-y coordinates, x-y-z coordinates, or polar coordinates.

15. The method of claim 9, wherein the processor renders and creates a bitmap image of the single page of the interactive Internet content prior to partitioning of the single page and then divides the bitmap image of the single page into the plurality of partitions when partitioning the single page such that each of the plurality of partitions is displayed fully on the monitor.

* * * * *